Sept. 4, 1956    K. SCHERRER    2,761,356
MACHINE TOOLS
Filed Nov. 10, 1952    3 Sheets-Sheet 1

INVENTOR.
Kurt Scherrer
BY
Henderoth, Lind & Ponack
Attorneys.

Sept. 4, 1956  K. SCHERRER  2,761,356
MACHINE TOOLS

Filed Nov. 10, 1952  3 Sheets-Sheet 2

INVENTOR:
K. Scherrer
by
Wenderoth, Lind & Ponack
Attys

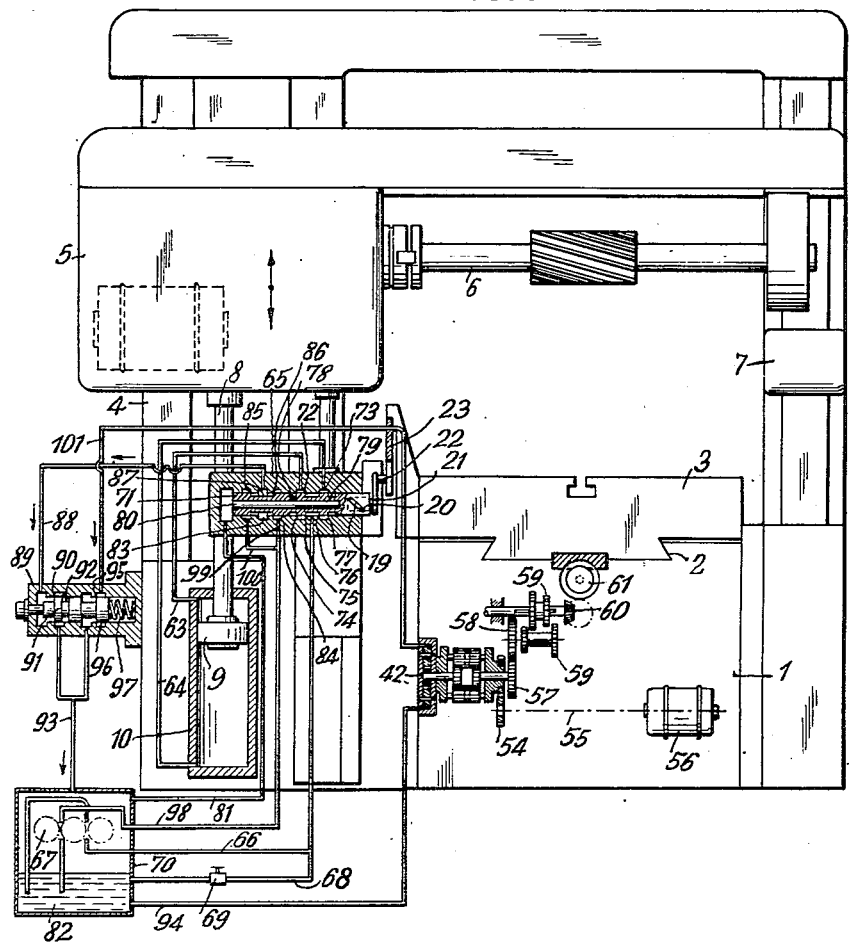

United States Patent Office 2,761,356
Patented Sept. 4, 1956

2,761,356

MACHINE TOOLS

Kurt Scherrer, Staad, near Rorschach, Switzerland, assignor to Starrfräsmaschinen A. G., Rorschacherberg, Switzerland Application November 10, 1952, Serial No. 319,646

Claims priority, application Switzerland November 15, 1951

7 Claims. (Cl. 90—13.5)

The present invention relates to a machine tool having a longitudinal table moved by means of a mechanical feed device and a hydraulic copying device comprising a cross slide moved along a linear jig.

With such machine tools known in the prior art curves may be copied only up to a certain steepness. It is, for example, not possible to copy from any side shoulders up to 90° with respect to the feed direction. For this reason machine tools have been constructed having as well a hydraulic longitudinal feed as also a hydraulic cross feed, whereby both feeds have been made dependent from one another. This is, however, suitable only for machines with limited dimensions and length.

According to the present invention a machine tool of the mentioned type is characterised in that a differential gear is interconnected in the mechanical longitudinal feed device, said gear being connected with a regulating unit controlled by the hydraulic copying device in such a way, that the speed of longitudinal feed is regulated in dependence of the longitudinally linear jig. Due to this, in machine tools of any length and dimension, curves and shoulders may be copied lying in an angular range of 0° to 180° and being independent from the direction of feed.

In a further embodiment the regulating unit is controlled by an auxiliary slide valve which in its turn is controlled by the main slide valve controlling the piston for the cross slide. Thereby an easier regulating is obtained. Two embodiments of the invention are shown, by way of example in the accompanying drawings, in which:

Fig. 5 is a diagrammatic view, partly in section, of a second embodiment of a horizontal milling machine.

Figure 1:
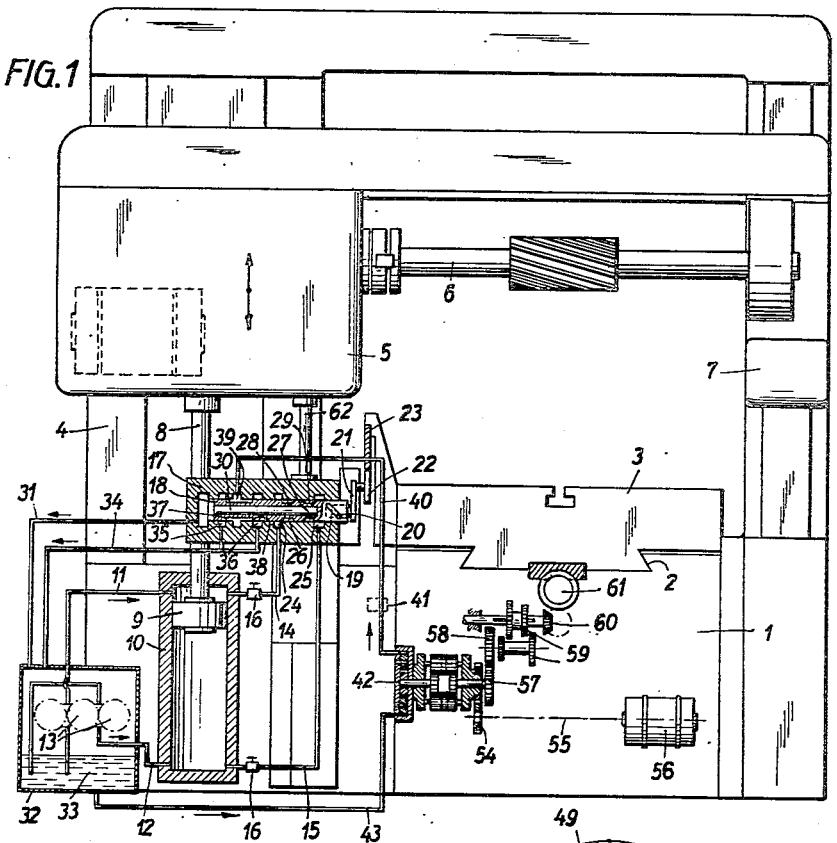
Fig. 1 shows a diagrammatic view, partly in section, of a horizontal milling machine.
Figure 2:
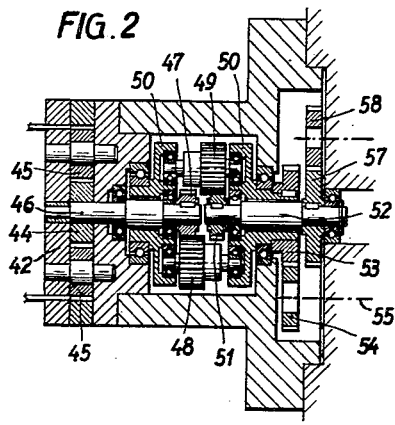
Fig. 2 is an enlarged longitudinal section through the regulator unit and through the differential gear.
Figure 3:
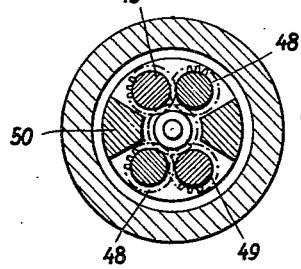
Fig. 3 is a cross-section through Fig. 2.
Figure 4:
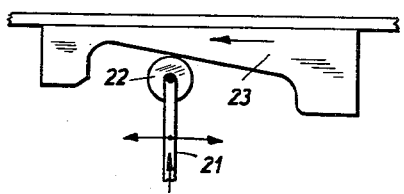
Fig. 4 shows a side view of the jig.
Figure 1A:
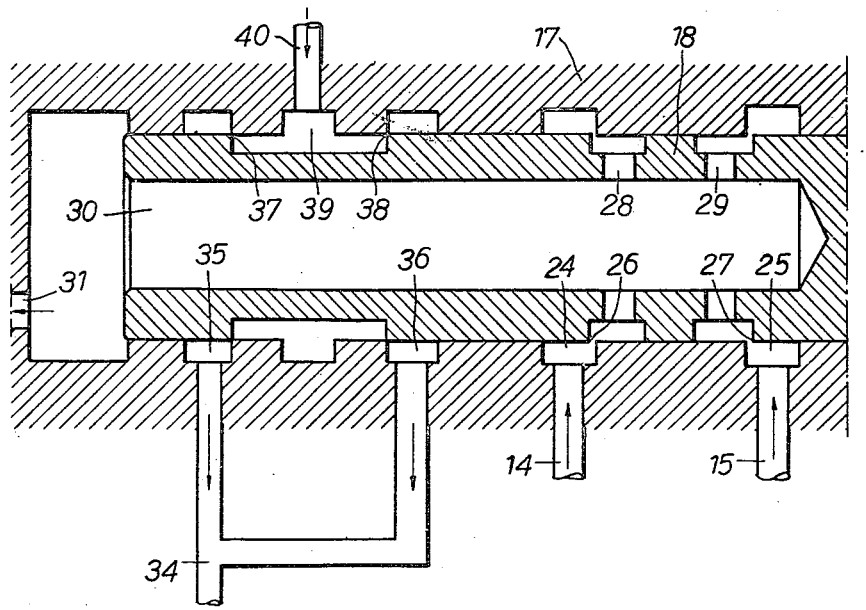
Figure 1a shows the hydraulic system of Figure 1 upon an enlarged scale.

In the embodiment shown in Figs. 1–4, the table 3 is longitudinally guided on the machine bed 3 in a guiding 2. A milling spindle box 5, with a coupled milling cone 6 and guiding slide 7, is vertically guided—i. e. transversely to the direction of feed of the table 3—on supports 4. A piston rod 8 bearing a piston 9 cooperating with a cylinder 10 is fixed to the lower portion of said milling spindle box 5. Conduits 11, 12 coming from an oil pump 13 are connected to said cylinder 10. Further conduits 14, 15 into each of which a governor valve 16 is interconnected, lead from said cylinder 10 to a control cylinder 17. A distributing slide valve 18 is located in said control cylinder 17, which slide valve 18 comprises a helicoidal groove 19 engaged by a pin 20 fixed in the cylinder 17 in such a way, that upon a rotary movement the slide valve 18 is axially shifted. The slide valve 18 is provided at its right end with a feeler arm 21 having a feeler roll 22 cooperating with a linear jig 23 fixed at the table 3. Two annular grooves 24, 25 connected with the conduits 14, 15 are provided in the control cylinder 17. The slide valve 18 further has openings 28, 29 and a bore 30 for the back-flow of the pressure medium. Control edges 26, 27 of the slide valve 18 cooperate with the annular grooves 24, 25. A return conduit 31 connected with the bore 30 leads from the control cylinder 17 to a container 32 containing the oil pump 13 and a sump 33. A further return conduit 34 to the container 32 is connected to a pair of annular grooves 35, 36 of the control cylinder. Control edges 37, 38 of the slide valve 18 cooperate with said pair of annular grooves 35, 36, which edges 37, 38 are connected to an annular groove 39 itself connected to a feeding conduit 40. This conduit 40 is provided with a governor valve 41 and is connected with a regulating unit 42 being in the present case a toothed wheel oil pump. A conduit 43 connects the sump 33 with the oil pump 42 which comprises pump wheels 44, 45, and a shaft 46 onto which a toothed wheel 47 of a planetary differential gear is mounted. The wheel 47 meshes with two planet wheels 48 diametrically opposite with respect to the axle of wheel 47 and engaging two further planet wheels 49. All four planet wheels 48, 49 are rotatably mounted on roller bearings in a planet wheel support 50. The two planet wheels 49 further mesh with a toothed wheel 51 mounted on a shaft 52. A spur wheel 53 fixed to the planet wheel support 50 meshes with another spur wheel 54 mounted on the shaft 55 of a driving motor 56. A spur wheel 57 mounted on the shaft 52 engages a spur wheel 58 driving over a change speed gear 59 and bevel wheels 60 the feed 61 of the table.

The machine tool illustrated in Figs. 1–4 operates as follows:

The piston 9 moving the milling spindle box 5 with the milling cone 6 vertically, i. e. crosswise with respect to the longitudinal movement of the table 3, is controlled by the slide valve 18. If, through cooperation of the feeler roll 22 with the jig 23 the feeler arm 21 is rotated, the slide valve 18 is rotated too, and due to the cooperation of the pin 20 with the helicoidal groove 19 is axially displaced without clearance. Following the displacement of the control edges 26, 27 of the slide valve 18 pressure fluid may escape through one of the conduits 14, 15 and one of the openings 28, 29, the bore 30 and the conduit 31, so that the piston 9 becomes discharged on one side and changes the elevation of the milling spindle box 5. The control cylinder 17 being mechanically connected to the milling spindle box 5 by means of a rigging 62, the necessary back action is guaranteed.

Parallel to the movement of the slide valve 18 its control edges 37, 38 are displaced. In the starting position shown in Fig. 1 of the slide valve 18 and of the said control edges 37, 38 no pressure fluid can flow from the conduit 40 and the annular groove 39 to the annular grooves 35, 36 and to the return conduit 34. Therefore no pressure fluid flows through the conduit 40 and the pump 42 is not actuated. The shaft 46 does not rotate so that the rotation transmitted from the shaft 55 of the motor 56 over the wheel 54 to the planet wheel support 50 is transmitted to the shaft 52 over the planet wheels 48, 49 engaging each other and the wheels 47, 51. Thereby the planet wheels 48 turn around the wheel 47. The slide 3 is moved at maximum speed by the shaft 52 over the toothed wheels 57, 58, the change speed gear 59, the bevel wheels 60 and the slide drive 61.

If the slide valve 18 is displaced out of the shown initial position the passage between the conduits 40 and 34 is opened at one of the control edges 37, 38, so that now pressure fluid may flow through the conduit 40 and the pump 42 be actuated. The rotation of the shaft 55 of the motor 56 transmitted over the toothed wheel 54 to the planet wheel support 50 is now partly transmitted to the shaft 46 of the pump 42 and partly over the shaft 52 to the drive 61 of the table 3, so that the latter rotates with small velocity, said velocity depending on the amount of fluid raised by the pump 42 through the valve 41 and through the passage in the slide valve 18. As soon as the control edges 37, 38, have attained the point in which the pump raises free from pressure the differential gear drives the pump only and the feed velocity of the table becomes zero, in other words the table 3 stands still and the planet wheels 49 turn around the now fixed wheel 51. This is used, for example, for milling a vertical shoulder. This enables the copying of curves of any steepness, even in machines the dimensions and properties of which exclude the use of a hydraulic drive for the longitudinal feed.

Figure 5A:
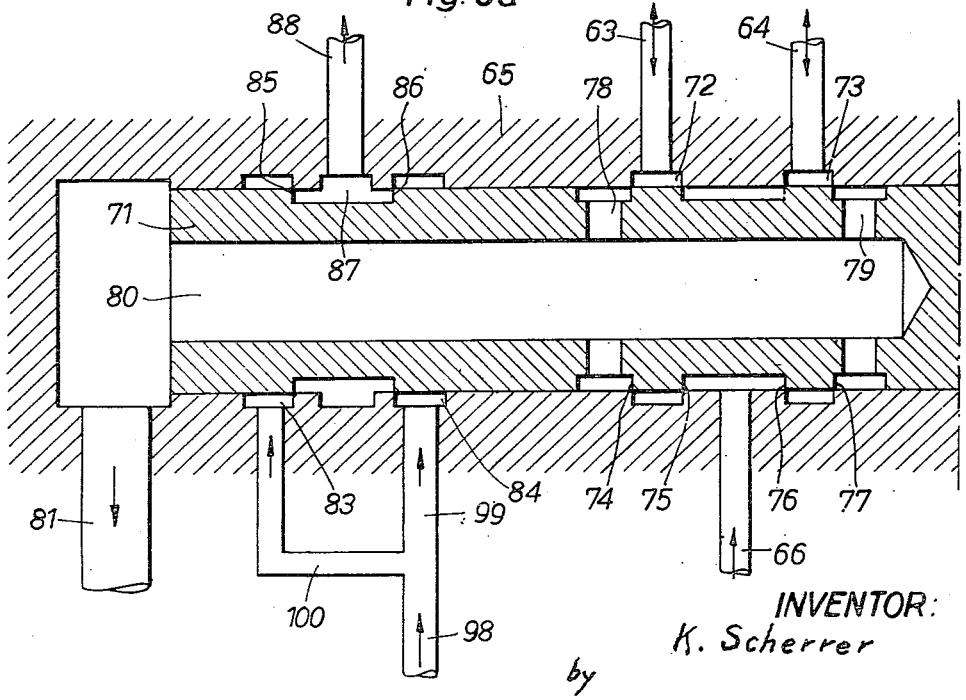
Figure 5a shows the hydraulic system of Figure 5 upon an enlarged scale.

In the embodiment illustrated in Fig. 5 conduits 63, 64 coming from a main control cylinder 65 are connected to the cylinder 10. The conduit 66 connects the oil pump 67 with said main control cylinder 65. A branch conduit 68 connects over a valve 69 the conduit 66 with an oil tank 70. The main control cylinder 65 contains a slide valve 71 provided with a helicoidal groove 19 engaged by a pin 20 fixed in the cylinder 65. Thus a rotation of the slide valve 71 results in an axial displacement of it. The slide valve 71 is provided at its right end with a feeler arm 21 having a feeler roll 22 cooperating with a linear jig 23 fixed at the table 3. Control edges 74, 75, 76, 77 of the slide valve 71 cooperate with a pair of annular grooves 72, 73 provided in the control cylinder 65 and connected to conduits 63, 64. Said slide valve 71 is further provided with openings 78, 79 and with a bore 80 for the return flow of the pressure fluid. A return conduit 81 connected with the bore 80 leads from the control cylinder 65 to a container 70 containing the oil pump 67 and a sump 82. A conduit 98 with two branch conduits 99 and 100 feeds the oil from the oil pump 67 to the control cylinder 65. Control edges 85 and 86 cooperate with the annular grooves 83 and 84 of the control cylinder 65. These edges 85 and 86 have a connexion with the annular groove 87 to which a conduit 88 leading to an auxiliary control cylinder 89 is connected. The control edge 90 of the slide valve 91 cooperates with an annular groove 92 in said auxiliary control cylinder 89 and permits back flowing of the oil to the container 70 through a return conduit 93.

A conduit 94 connects the sump 82 with a regulating unit 42 corresponding to the one shown and described with respect to the embodiment of Figs. 1–4.

The machine tool shown in Fig. 5 operates as follows: The piston 9, which displaces the milling spindle box 5 with the milling cone 5 in vertical direction crosswise to the longitudinal movement of the table 3, is controlled by the main slide valve 71. If, through cooperation of the feeler roll 22 with the jig 23 the feeler arm 21 is rotated, the slide valve 71 is rotated too, and axially shifted due to cooperation of the pin 20 with the helicoidal groove 19. Due to the displacement of the control edges 74, 75, 76, 77 of the main slide valve 71, pressure fluid may escape through one of the conduits 63, 64 through one of the openings 78, 79, the bore 80 and the conduit 81 so that the piston 9 is discharged on one side and varies the elevation of the milling spindle box 5. The control cylinder 65 is mechanically connected to the milling spindle box 5 by means of a rigging 62 so that the necessary back guiding is guaranteed. The displacement of the main slide valve 71 also displaces its control edges 85, 86. In the initial position of the slide valve 71 illustrated in Fig. 5 the position is such that no pressure fluid may pass from the conduit 98 and annular grooves 83, 84 to the annular groove 87 and conduit 88 leading to the second control cylinder 89. No pressure fluid flowing through the conduit 88, the auxiliary slide valve 91 is not axially shifted. This results in the control edge 95 remaining in the position, in which the passage of oil from the annular groove 96 into the return conduit 93 is closed, so that the pump 42 cannot rotate. The shaft 46 does not rotate so that the rotation transmitted from the shaft 55 of the motor 56 over the wheel 54 to the planet wheel support 50 is transmitted to the shaft 52 over the planet wheels 48, 49 engaging each other and the wheels 47, 51. Thereby the planet wheels 48 turn around the wheel 47. The slide 3 is moved at maximum speed by the shaft 52 over the toothed wheels 57, 58, the change speed gear 59, the bevel wheels 60 and the slide drive 61.

If the main slide valve 71 is somewhat displaced out of the shown initial position the mentioned passage between the conduits 98 and 88 is opened at one of the control edges 85, 86 so that now pressure fluid may flow through the conduit 88 and reach the auxiliary slide valve 91. According to the passing quantity of oil the auxiliary slide valve 91 is axially shifted against the action of a spring 97 so that the control edge 95 opens the passage to the conduit 101 and the pump 42 can rotate. The rotation of the shaft 55 of the motor 56 transmitted over the toothed wheel 54 to the planet wheel support 50 is now partly transmitted to the shaft 46 of the pump 42 and partly over the shaft 52 to the table drive 61. It results therefrom a reduced speed of the table 3 whereby this speed depends on the quantity of fluid raised by the pump 42 through the passage in the slide valve 91. If the control edge 95 is displaced to such an amount that the pump raises without pressure, only the pump is driven by the differential gear and the speed of feed of the table 3 becomes zero. In other words the table 3 stands still and the planet wheels 49 turn around the now fixed wheel 51. This is the case when, for example, a vertical shoulder is to be milled. This enables the copying of curves of any steepness, even in machines the dimensions and properties of which exclude the use of a hydraulic drive for the longitudinal drive. In this case the control edges 85, 86 only serve to pre-control the slide valve 91 associated with the regulating unit 42. This provides an easy regulation of the associated control edges.

I claim:

1. In a machine tool having a longitudinal movable table and a transversely movable cross slide, the combination comprising a mechanical feed device for said longitudinal movement of said table, a differential gear interconnected in said mechanical feed device, a regulating unit connected to said differential gear for changing the speed of the longitudinal feed, a working piston for movement of said cross slide, a hydraulic copying device for controlling said cross slide including a hydraulic control slide valve, a feeler, a longitudinally linear jig engaging said feeler, additional control means adjusted according to the position of said control slide valve, and a connection between said additional control means and said regulating unit for controlling said regulating unit according to the position of said control slide valve of the hydraulic copying device so that the speed of longitudinal feed is regulated in dependence of said longitudinally linear jig.

2. In a machine tool having a longitudinal movable table and a transversely movable cross slide the combination comprising a mechanical feed device for longitudinal movement of said table, a differential gear interconnected in said mechanical feed device, a regulating unit connected to said differential gear for changing the speed of the longitudinal feed, a working piston for movement of said cross slide, a hydraulic copying device for controlling said cross slide including a hydraulic control slide valve, a feeler, a longitudinally linear jig engaging said feeler, additional control means adjusted according to the position of said control slide valve, a connection between said additional control means and said regulating unit for controlling said regulating unit according to the position of said control slide valve of the hydraulic copying device, said additional control means including control edges on said slide valve and said regulating unit comprising a governor member and a hydraulic pump fed over said governor member and over said control edges so that the speed of longitudinal feed is regulated in dependence of the longitudinally linear jig.

3. In a machine tool having a longitudinal movable table and a transversely movable cross slide the combination comprising a mechanical feed device for longitudinal movement of said table, a differential gear interconnected in said mechanical feed device, a regulating unit connected to said differential gear for changing the speed of the longitudinal feed, a working piston for movement of said cross slide, a hydraulic copying device for controlling said cross slide including a hydraulic control slide valve, a feeler, a longitudinally linear jig engaging said feeler, additional control means adjusted according to the position of said control slide valve, a connection between said additional control means and said regulating unit for controlling said regulating unit according to the position of said control slide valve of the hydraulic copying device, said additional control means including control edges on said slide valve and said regulating unit comprising a governor member and a hydraulic pump fed over said governor member and over said control edges and said differential gear being a planet gear comprising a support connected to said feed device, a first sun wheel, an axle for said first sun wheel coupled to said longitudinal movable table, a second sun wheel, an axle for said second sun wheel coupled to said hydraulic pump, and planet wheels engaging said sun wheels, the said regulating unit being controlled by said hydraulic copying device so that the speed of longitudinal feed is regulated in dependence of the longitudinally linear jig.

4. In a machine tool having a longitudinal movable table and transversely movable cross slide and combination comprising a mechanical feed device for longitudinal movement of said table, a differential gear interconnected in said mechanical feed device, a regulating unit connected to said differential gear for changing the speed of the longitudinal feed, a hydraulic copying device for controlling said cross slide including a working piston for said cross slide, a hydraulic control slide valve, a feeler, a longitudinally linear jig engaging said feeler, additional control means adjusted according to the position of said control slide valve, an auxiliary slide valve interconnected between said additional control means and said regulating unit, said working piston and said auxiliary slide valve both controlled by said control slide valve, said auxiliary slide valve controlling said regulating unit according to the position of said control slide valve of the hydraulic copying device so that the speed of longitudinal feed is regulated in dependence of the longitudinally linear jig.

5. In a machine tool having a longitudinal movable table and a transversely movable cross slide the combination comprising a mechanical feed device for longitudinal movement of said table, a differential gear interconnected in said mechanical feed device, a regulating unit connected to said differential gear for changing the speed of the longitudinal feed, a hydraulic copying device for controlling said cross slide including a working piston for said cross slide, a hydraulic control slide valve, a feeler, a longitudinally linear jig engaging said feeler, additional control means adjusted according to the position of said control slide valve, an auxiliary slide valve interconnected between said additional control means and said regulating unit, said working piston and said auxiliary slide valve both controlled by said control slide valve, said auxiliary slide valve comprising a spring-loaded piston and said additional control means including control edges on said slide valve to control said piston against the action of said spring, said piston having a control edge to control the fluid cycle of the regulating unit according to the position of said control slide valve of the hydraulic copying device so that the speed of longitudinal feed is regulated in dependence of the longitudinally linear jig.

6. In a machine tool having a longitudinal movable table and a transversely movable cross slide, the combination comprising a mechanical feed device for longitudinal movement of said table, a differential gear interconnected in said mechanical feed device, a regulating unit connected to said differential gear for changing the speed of the longitudinal feed, a hydraulic copying device for controlling said cross slide including a working piston for said cross slide, a hydraulic control slide valve, a feeler, a longitudinally linear jig engaging said feeler, additional control means adjusted according to the position of said control slide valve, an auxiliary slide valve interconnected between said additional control means and said regulating unit, said working piston and said auxiliary slide valve both controlled by said control slide valve and a feeding conduit leading to said control slide valve comprising a branch conduit provided with a governor valve, said auxiliary slide valve controlling said regulating unit according to the position of said control slide valve of the hydraulic copying device so that the speed of longitudinal feed is regulated in dependence of the longitudinally linear jig.

7. A fluid control system for controlling the transverse movement of a cross slide of a machine tool comprising a working piston connected to said cross slide, a working cylinder surrounding said working piston, a fluid pump for producing a fluid pressure, conduits connecting said fluid pump to said working cylinder, a control slide valve, conduits connecting said control slide valve to said working cylinder and for the return of the fluid, said control slide valve including a control cylinder and a control piston, a feeler connected to said control piston, a longitudinal jig engaging said feeler for controlling the transverse movement of said cross slide, a regulating unit intended for changing the speed of the longitudinal feed of the machine tool, conduits connecting said regulating unit to said control valve so that the speed of the longitudinal feed movement of the machine tool is controlled in dependence of said jig.

References Cited in the file of this patent

UNITED STATES PATENTS

| | | |
|---|---|---|
| 2,330,890 | Horlacher | Oct. 5, 1943 |
| 2,335,304 | Parsons | Nov. 30, 1943 |
| 2,335,305 | Parsons | Nov. 30, 1943 |
| 2,345,116 | Hanna | Mar. 28, 1944 |